United States Patent
Hatakeyama et al.

(10) Patent No.: US 11,601,076 B2
(45) Date of Patent: Mar. 7, 2023

(54) MOTOR DRIVING APPARATUS AND REFRIGERATION CYCLE EQUIPMENT

(71) Applicant: Mitsubishi Electric Corporation, Tokyo (JP)

(72) Inventors: Kazunori Hatakeyama, Tokyo (JP); Keisuke Uemura, Tokyo (JP); Yuichi Shimizu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 349 days.

(21) Appl. No.: 16/957,909

(22) PCT Filed: Feb. 28, 2018

(86) PCT No.: PCT/JP2018/007508
§ 371 (c)(1),
(2) Date: Jun. 25, 2020

(87) PCT Pub. No.: WO2019/167169
PCT Pub. Date: Sep. 6, 2019

(65) Prior Publication Data
US 2021/0305921 A1    Sep. 30, 2021

(51) Int. Cl.
*H02P 5/74*    (2006.01)
*F25B 31/02*    (2006.01)
(Continued)

(52) U.S. Cl.
CPC .............. *H02P 5/74* (2013.01); *F25B 31/026* (2013.01); *H02M 7/537* (2013.01); *H02P 21/05* (2013.01); *H02P 27/06* (2013.01)

(58) Field of Classification Search
CPC .. H02P 5/74; H02P 21/05; H02P 27/06; F25B 31/026
See application file for complete search history.

(56) References Cited

U.S. PATENT DOCUMENTS

2008/0150455 A1\*    6/2008    Shinmura .............. H02K 11/33
310/198

FOREIGN PATENT DOCUMENTS

| JP | 2000-228898 A | 8/2000 |
| JP | 2004-187487 A | 7/2004 |

(Continued)

OTHER PUBLICATIONS

Takayuki Moroi, Independent Vector Control of Two Permanent Magnet Synchronous Motors Fed by a Four-Leg Inverter, IEEE (Year: 2012).\*
(Continued)

*Primary Examiner* — Bickey Dhakal
(74) *Attorney, Agent, or Firm* — Posz Law Group, PLC

(57) ABSTRACT

In a motor driving apparatus having an inverter which can drive n (n being an integer not smaller than 2) motors each having a permanent magnet in its rotor, and a connection switching device for switching the connection state of the n motors, the connection switching device is operated to change the number of the motors connected to the inverter thereby to change the impedance as seen from the inverter towards the motors. When i (i being any of 2 to n) motors among the n motors are concurrently driven by the inverter, the voltage outputted by the inverter may be controlled such that the inductance values of the i motors are identical. It is possible to prevent hunting and step-out due to the phase difference between the motors driven by the inverter.

20 Claims, 8 Drawing Sheets

(51) Int. Cl.
*H02M 7/537* (2006.01)
*H02P 21/05* (2006.01)
*H02P 27/06* (2006.01)

(56) References Cited

FOREIGN PATENT DOCUMENTS

| | | | |
|---|---|---|---|
| JP | 2004343822 A | * | 12/2004 |
| JP | 2006-320128 A | | 11/2006 |
| JP | 2008-154326 A | | 7/2008 |
| JP | 2010263710 A | * | 11/2010 |
| JP | 2012-231671 A | | 11/2012 |

OTHER PUBLICATIONS

International Search Report of the International Searching Authority dated May 29, 2018 for the corresponding International application No. PCT/JP2018/007508 (and English translation).

* cited by examiner

MOTOR DRIVING APPARATUS AND REFRIGERATION CYCLE EQUIPMENT

CROSS REFERENCE TO RELATED APPLICATION

This application is a U.S. national stage application of International Patent Application No. PCT/JP2018/007508 filed on Feb. 28, 2018, the disclosure of which is incorporated herein by reference.

TECHNICAL FIELD

The present invention relates to a motor driving apparatus, and refrigeration cycle equipment provided therewith.

BACKGROUND

In a known technology for driving two or more permanent magnet synchronous motors (PMSMs) using a single inverter device, a value of a voltage or a current generated in one of the PMSMs is detected, and when the detected current value becomes equal to or smaller than a prescribed current value, the lead angle of the current is made larger to increase the current, thereby to prevent hunting and step-out (e.g., Patent Reference 1).

PATENT REFERENCES

Patent Reference 1: Japanese Patent Publication No. 2008-154326

When the synchronous motor is an interior magnet type motor rather than a surface magnet type motor, reluctance torque is generated due to the difference between the d-axis inductance and the q-axis inductance. Therefore, when the lead angle of the current is increased according to the technology described in Patent reference 1, the output torque of the motor is increased, and the current for outputting the same torque is reduced, which in turn increases the possibility of hunting or step-out.

SUMMARY

The present invention has been made in view of the above, and its object is to prevent hunting and step-out due to the phase difference between a plurality of motors driven by a common inverter.

In order to solve the problem explained above, a motor driving apparatus according to the present invention comprises:

an inverter which can drive n (n being an integer not smaller than two) motors each having a permanent magnet in its rotor; and a connection switching device to switch a connection state of said n motors; wherein said connection switching device is operated to change the number of the motors connected to said inverter so as to change impedance as seen from said inverter towards said motors.

According to the present invention, it is possible to prevent hunting and step-out due to the phase difference between the plurality of motors driven by a common inverter.

DETAILED DESCRIPTION

Description will now be made on a motor driving apparatus according to embodiments of the present invention, and refrigeration cycle equipment provided therewith, with reference to the attached drawings. The following embodiments do not impose limitations on the present invention.

First Embodiment

Figure 1:
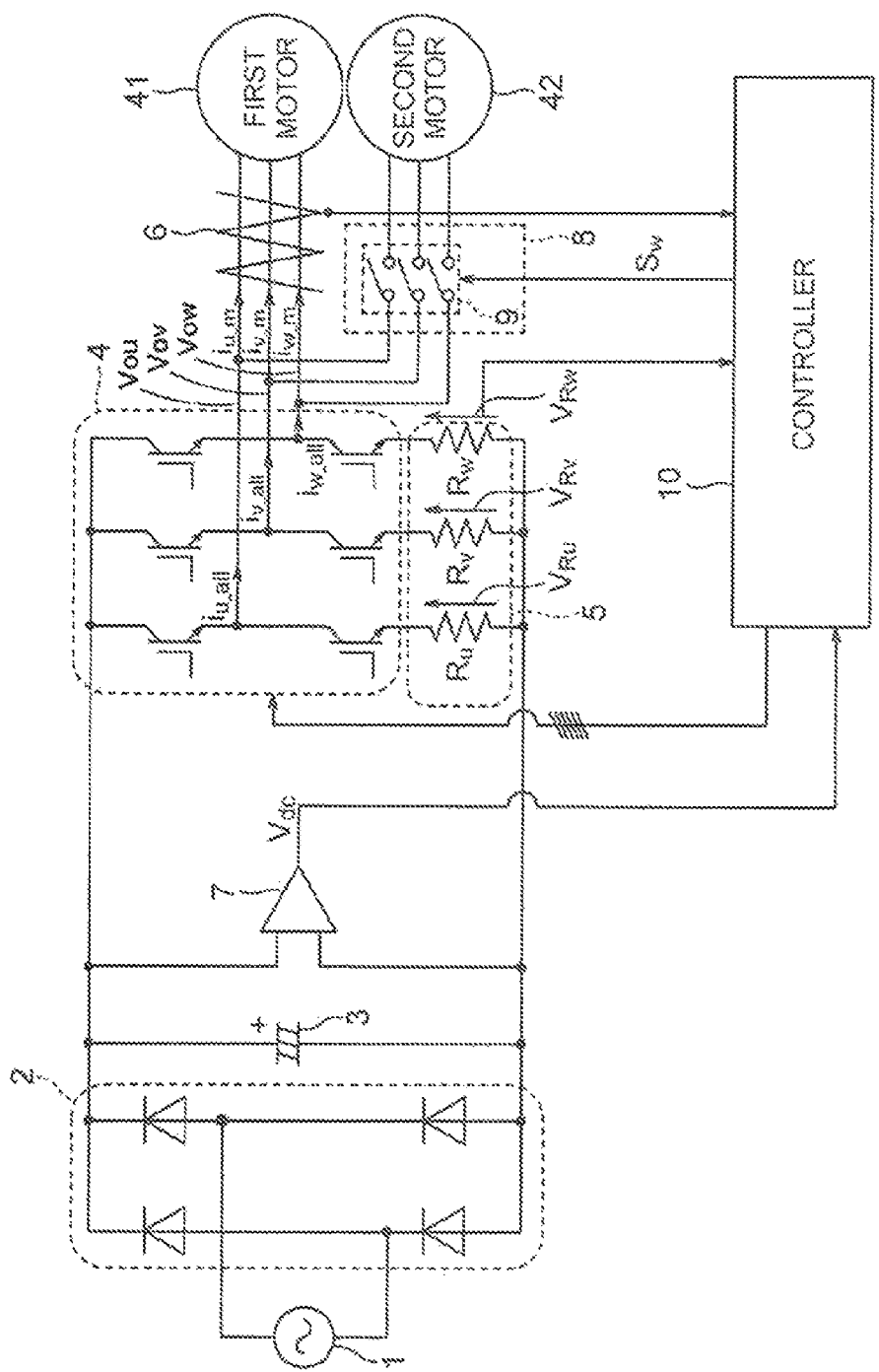
FIG. 1 is a schematic diagram showing an example of a configuration of a motor driving apparatus of a first embodiment of the present invention.

FIG. 1 shows a motor driving apparatus of a first embodiment of the present invention. The motor driving apparatus is for driving first and second permanent magnet synchronous motors 41 and 42. In the following description, the "permanent magnet synchronous motor" may be referred to simply as a "motor".

The illustrated motor driving apparatus includes a rectifier 2, a smoothing circuit 3, an inverter 4, an inverter current detector 5, a motor current detector 6, an input voltage detector 7, a connection switching device 8, and a controller 10.

The rectifier 2 rectifies AC power from an AC power supply 1 to generate DC power.

The smoothing circuit 3 is famed of a capacitor or the like, and smoothes the DC power from the rectifier 2 and supplies the smoothed power to the inverter 4.

Incidentally, the AC power supply 1 in the example of FIG. 1 is of a single-phase, but it may be a three-phase power supply. When the AC power supply 1 is of a three-phase, a three-phase rectifier is used as the rectifier 2.

As the capacitor of the smoothing circuit 3, an aluminum electrolytic capacitor having a large capacitance is often used in general, but a film capacitor, which has a long service life, may be used. The configuration may be such that a capacitor having a small capacitance is used so as to restrain harmonics of a current flowing through the AC power supply 1.

Also, a reactor (not shown) may be inserted between the AC power supply 1 and the capacitor 3, in order to restrain the harmonic currents or to improve the power factor.

The inverter 4 receives the voltage across the capacitor 3, and outputs a three-phase AC power with a variable frequency and a variable voltage value.

The first motor 41 and the second motor 42 are connected in parallel with each other to the output of the inverter 4.

In the illustrated example, the connection switching device 8 is formed of a single switch 9. The switch 9 can connect or disconnect the second motor 42 to or from the inverter 4. By the opening and closing of the switch 9, the number of the motors which are concurrently operated can be changed.

As semiconductor switching elements forming the inverter 4, IGBTs (Insulated Gate Bipolar Transistors) or MOSFETs (Metal Oxide Semiconductor Field Effect Transistors) are often used.

A configuration may be used in which freewheel diodes (not shown) are connected in parallel with the semiconductor switching elements for the purpose of restraining surge voltages due to switching of the semiconductor switching elements.

Parasitic diodes of the semiconductor switching elements may be used as the freewheel diodes. In the case of MOSFETs, functions similar to those of the freewheel diodes can be realized by turning on the MOSEETs at the timing of freewheeling.

The material forming the semiconductor switching elements is not limited to silicon Si, but may be wide-bandgap semiconductor, such as silicon carbide SiC, gallium nitride GaN, gallium oxide $Ga_2O_3$, diamond, or the like. By the use of wide-bandgap semiconductor, it is possible to reduce the power loss and increase the switching speed.

As the switch 9, an electromagnetic switch such as a mechanical relay, a contactor or the like may be used in place of a semiconductor switching element. In summary, any type of device having a similar function may be used.

In the illustrated example, the switch 9 is provided between the second motor 42 and the inverter 4. Alternatively, the switch 9 may be provided between the first motor 41 and the inverter 4. Two switches may be provided, one switch between the first motor 41 and the inverter 4, and the other switch between the second motor and the inverter 4. When two switches are provided, the connection switch unit 8 is formed of the two switches.

In the illustrated example, two motors are connected to the inverter 4. Alternatively, three or more motors may be connected to the inverter 4. When three or more motors are connected to the inverter 4, a switch similar to the switch 9 may be provided between each of all the motors and the inverter 4. Alternatively, a switch similar to the switch 9 may be provided between each of some only of the motors and the inverter 4. In these cases, such a plurality of switches constitute the connection switching device 8.

The inverter current detector 5 detects the currents flowing through the inverter 4. In the illustrated example, the inverter current detector 5 determines the currents (inverter currents) $i_{u\_all}$, $i_{v\_all}$, $i_{w\_all}$ of the respective phases of the inverter 4, based on the voltages $V_{Ru}$, $V_{Rv}$, $V_{Rw}$ across the resistors $R_u$, $R_v$, $R_w$ respectively connected in series with the switching elements of the three lower arms of the inverter 4.

The motor current detector 6 detects the currents of the first motor 41. The motor current detector 6 includes three current transformers respectively detecting the currents (phase currents) $i_{u\_m}$, $i_{v\_m}$, $i_{w\_m}$ of the three phases.

The input voltage detector 7 detects the input voltage of the inverter 4 (DC bus line voltage), $V_{dc}$.

The controller 10 outputs signals for operating the inverter 4 based on the current values detected by the inverter current detector 5, the current values detected by the motor current detector 6, and the voltage value detected by the input voltage detector 7.

Incidentally, in the above-described example, the inverter current detector 5 detects the currents of the respective phases of the inverter 4, using the three resistors connected in series with the switching elements of the lower arms of the inverter 4. Alternatively, it may detect the currents of the respective phases of the inverter 4, using a resistor connected between a common junction point of the switching elements of the lower arms, and a negative-side electrode of the capacitor 3.

Also, in addition to the motor current detector 6 detecting the currents of the first motor 41, a motor current detector for detecting the currents of the second motor may be provided.

In place of the current transformers for the detection of the motor currents, Hall elements may be used, or a configuration in which each current is calculated from a voltage across a resistor may be used.

Similarly, current transformers, Hall elements or the like may be used for the detection of the inverter currents, in place of the configuration in which each current is calculated from a voltage across a resistor.

The controller 10 can be implemented by a processing circuit. The processing circuit may be formed of dedicated hardware, or software, or a combination of hardware and software. When implemented by software, the controller 10 can be formed of a microcomputer including a CPU (central processing unit), a DSP (Digital Signal Processor) or the like.

Figure 2:
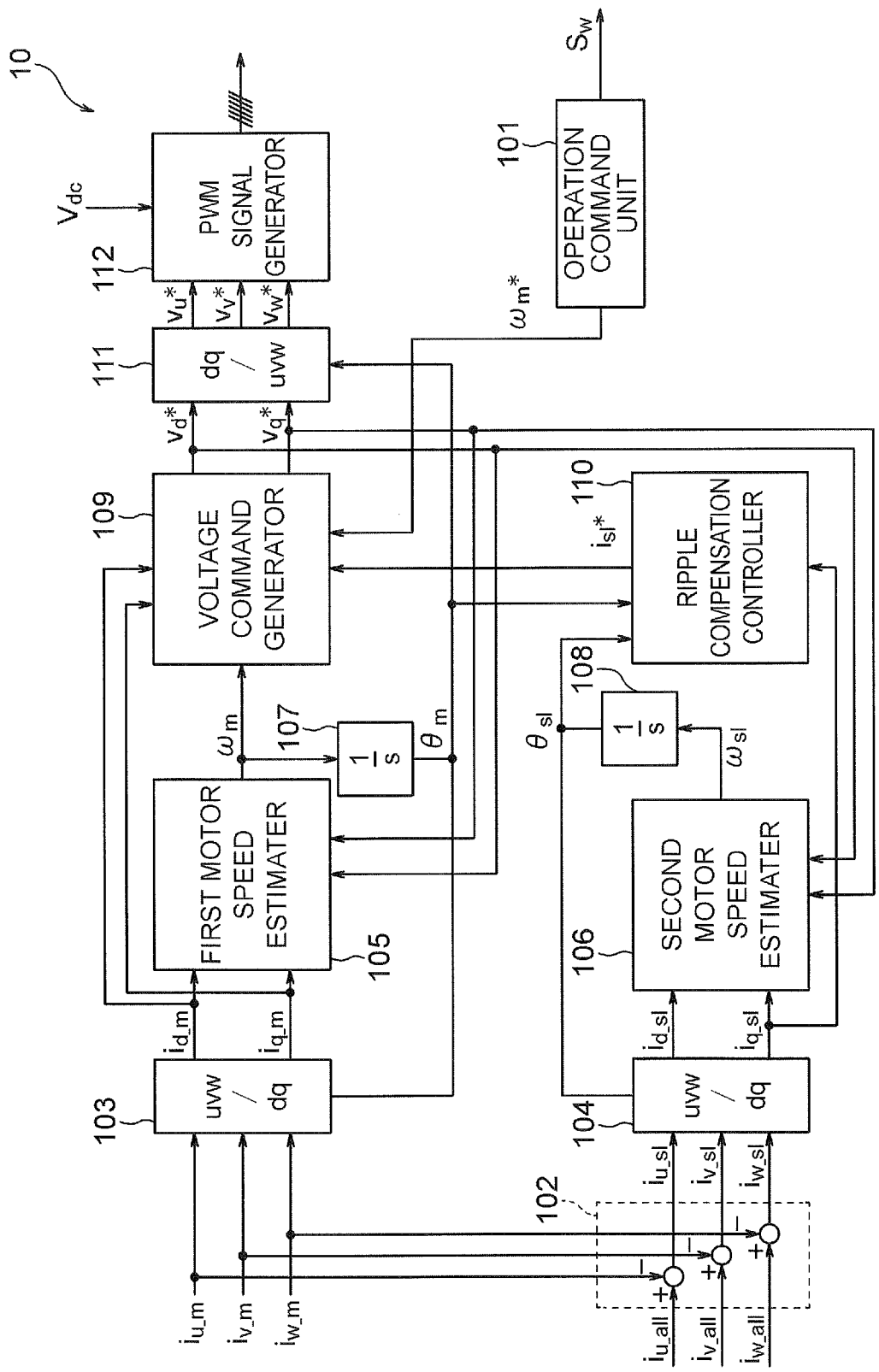
FIG. 2 is a block diagram showing an example of a configuration of a controller in FIG. 1.

FIG. 2 is a functional block diagram showing a configuration of the controller 10.

As illustrated, the controller 10 includes an operation command unit 101, a subtractor 102, coordinate converters 103, 104, speed estimators 105, 106, integrators 107, 108, a voltage command generator 109, a ripple compensation controller 110, a coordinate converter 111, and a PWM signal generator 112.

The operation command unit 101 generates and outputs a rotational speed command value $\omega_m{'}$ for the motors. The operation command unit 101 also generates and outputs a switching control signal Sw for controlling the connection switching device 8.

The subtractor 102 subtracts the phase currents $i_{u\_m}$, $i_{v\_m}$, $i_{w\_m}$ of the first motor 41 from the phase currents $i_{u\_all}$, $i_{v\_all}$, $i_{w\_all}$ of the inverter 4 detected by the inverter current detector 5, to determine the phase currents $i_{u\_sl}$, $i_{v\_sl}$, $i_{w\_sl}$ of the second motor 42.

This utilizes the relation that the sums of the phase currents $i_{u\_m}$, $i_{v\_m}$, $i_{w\_m}$ of the first motor 41 and the phase currents $i_{u\_sl}$, $i_{v\_sl}$, $i_{w\_sl}$ of the second motor 42 are equal to the phase currents $i_{u\_all}$, $i_{v\_all}$, $i_{w\_all}$ of the inverter.

The coordinate converter 103 determines dq-axis currents $i_{d\_m}$, $i_{q\_m}$ of the first motor 41, by performing coordinate conversion of the phase currents $i_{u\_m}$, $i_{v\_m}$, $i_{w\_m}$ of the first motor 41, from a stationary three-phase coordinate system to a rotational two-phase coordinate system, using a phase estimated value (magnetic pole position estimated value) $\theta_m$ of the first motor 41, to be described later.

The coordinate converter 104 determines dq-axis currents $i_{d\_sl}$, $i_{q\_sl}$ of the second motor 42, by performing coordinate conversion on the phase currents $i_{u\_sl}$, $i_{v\_sl}$, $i_{w\_sl}$ of the second motor 42, from the stationary three-phase coordinate system to the rotational two-phase coordinate system, using a phase estimated value (magnetic pole position estimated value) $\theta_{sl}$ of the second motor 4, to be described later.

The first motor speed estimator 105 determines a rotational speed estimated value $\omega_m$ of the first motor 41, based on the dq-axis currents $i_{d\_m}$, $i_{q\_m}$ and dq-axis voltage command values $v_d^*$, $v_q^*$.

Similarly, the second motor speed estimator 106 determines a rotational speed estimated value $\omega_{sl}$ of the second motor 42, based on the dq-axis currents $i_{d\_sl}$, $i_{q\_sl}$ and the dq-axis voltage command values $v_d^*$, $v_q^*$ to be described later.

The integrator 107 integrates the rotational speed estimated value $\omega_m$ of the first motor 41 to determine the phase estimated value $\theta_m$ of the first motor 41.

Similarly, the integrator 108 integrates the rotational speed estimated value $\omega_{sl}$ of the second motor 42 to determine the phase estimated value $\theta_{sl}$ of the second motor 42.

Incidentally, for the estimation of the rotational speed and the phase, the method described in Japanese Patent No. 4672236, for example, may be used. But any other method for estimating the rotational speed and the phase may be used. A method for directly detecting the rotational speed or the phase may also be used.

The voltage command generator 109 calculates the dq-axis voltage command values $v_d^*$, $v_q^*$, based on the dq-axis currents $i_{d\_m}$, $i_{q\_m}$ of the first motor 41, the rotational speed estimated value $\omega_m$ of the first motor 41, and a ripple compensation current command value $i_{sl}^*$ to be described later.

The coordinate converter 111 determines an applied voltage phase $\theta_v$, from the phase estimated value $\theta_m$ of the first motor 41 and the dq-axis voltage command values $v_d^*$, $v_q^*$, and determines voltage command values $v_u^*$, $v_v^*$, $v_w^*$ in the stationary three-phase coordinate system, by performing coordinate conversion of the dq-axis voltage command values $v_d^*$, $v_q^*$, from the rotational two-phase coordinate system to the stationary three-phase coordinate system, based on the applied voltage phase $\theta_v$.

For example, the applied voltage phase $\theta_v$ can be obtained by adding the lead phase angle $\theta_f$ obtained by $$\theta_f = \tan^{-1}(v_q^*/v_d^*)$$

from the dq-axis voltage command values $v_d^*$, $v_q^*$, to the phase estimated value $\theta_m$ of the first motor 41.

Figures 3A, 3B, 3C:
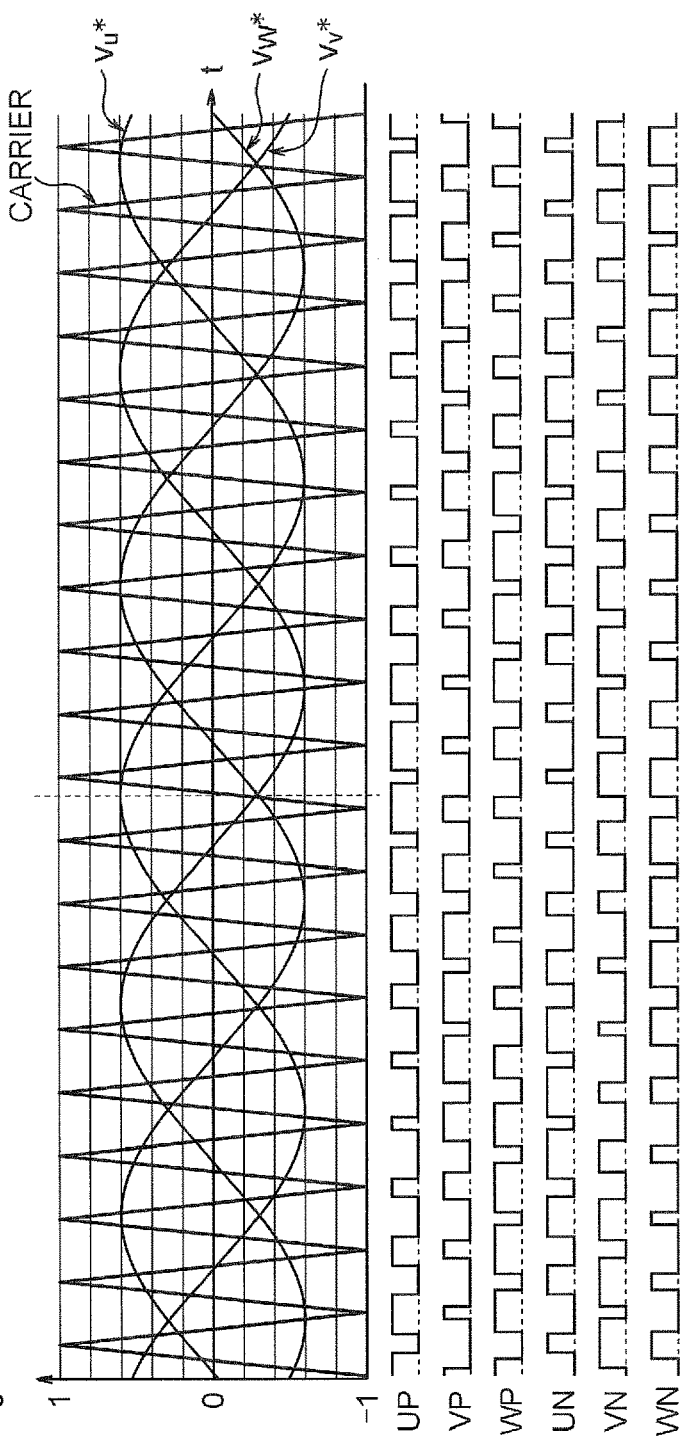
FIGS. 3(a) to 3(c) are diagrams showing the operation of a PWM signal generator in FIG. 2.

Examples of the phase estimated value $\theta_m$, the lead phase angle $\theta_f$, and the applied voltage phase $\theta_v$ are shown in FIG. 3(a), and examples of the voltage command values $v_u^*$, $v_v^*$, $v_w^*$ determined by the coordinate converter 111 are shown in FIG. 3(b).

The PWM signal generator 112 generates PWM signals UP, VP, WP, UN, VN, WN shown in FIG. 3(c), from the input voltage $V_{dc}$ and the voltage command values $v_u^*$, $v_v^*$, $v_w^*$.

The PWM signals UP, VP, WP, UN, VN, WN are supplied to the inverter 4 and used for control over the switching elements.

The inverter 4 is provided with a driving circuit, not shown, for generating, based on the PWM signals UP, VP, WP, UN, VN, WN, drive signals for driving the switching elements of the respectively corresponding arms.

By controlling ON/OFF of the switching elements of the inverter 4 based on the above-mentioned PWM signals UP, VP, WP, UN, VN, WN, AC voltages Vou, Vov, Vow with a variable frequency and a variable voltage value can be outputted from the inverter 4, and applied to the first motor 41 and the second motor 42.

In the example shown in FIG. 3(b), the voltage command values $v_u^*$, $v_v^*$, $v_w^*$ are sinusoidal, but the voltage command values may be ones with a third harmonic wave superimposed, and they may be of any waveform as long as they can drive the first motor 41 and the second motor 42.

If the voltage command generator 109 were so configured to generate the voltage command based only on the dq-axis currents $i_{d\_m}$, $i_{q\_m}$ and the rotational speed estimated value $\omega_m$ of the first motor 41, then, although the first motor 41 would be controlled properly, the second motor 42 would operate merely in accordance with the voltage command values generated for the first motor 41, and would be in a condition in which it is not directly controlled.

As a result, the first motor 41 and the second motor 42 would operate in a state in which there is a difference between the phase estimated value Om and the phase estimated value $\theta_{sl}$, and the errors would be conspicuous in the low speed region.

If there is a difference, the current ripple occurs in the second motor 42, and there are possibilities of step-out of the second motor 42, or increase of loss due to heat-generation due to excessive currents. Moreover, the excessive currents may cause circuit interruption, stopping the motor, so that the load cannot be driven.

The ripple compensation controller 110 is provided to solve such problems, and outputs the ripple compensation current command value $i_{sl}^*$ for restraining the current ripple of the second motor 42, using the q-axis current $i_{q\_sl}$ of the second motor 42, the phase estimated value $\theta_m$ of the first motor 41, and the phase estimated value $\theta_{sl}$ of the second motor 42.

The ripple compensation current command value $i_{sl}'$ is determined to restrain the ripple of the q-axis current $i_{q\_sl}$ which corresponds to the torque current of the second motor 42, based on the phase relation between the first motor 41 and the second motor 42, determined based on the phase estimated value $\theta_m$ of the first motor 41, and the phase estimated value $\theta_{sl}$ of the second motor 42.

The voltage command generator 109 performs proportional-integral computation on the difference between the rotational speed command value $\omega_m^*$ of the first motor 41 from the operation command unit 101, and the rotational speed estimated value $\omega_m$ of the first motor 41, to determine a q-axis current command value $I_{q\_m}^*$ of the first motor 41.

The d-axis current of the first motor 41 is an excitation current component, and, by varying its value, it is possible to control the current phase, and drive the first motor 41 with magnetic flux strengthening or magnetic flux weakening. Because of such characteristics, by changing the d-axis current command value $I_{d\_m}^*$ of the first motor 41, in accordance with the ripple compensation current command value $i_{sl}^*$ mentioned above, it is possible to control the current phase, and restrain the ripple.

The voltage command generator 109 determines the dq-axis voltage command values $v_d^*$, $v_q^*$ based on the dq-axis current command values $I_{d\_m}^*$, $I_{q\_m}^*$ determined in the manner described above, and the dq-axis currents $i_{d\_m}$, $i_{q\_m}$ determined by the coordinate converter 103. That is, it performs proportional-integral computation on the difference between the d-axis current command value $I_{d\_m}^*$ and the d-axis current $i_{d\_m}$, to determine the d-axis voltage command value $v_d^*$, and performs proportional-integral computation on the difference between the q-axis current command value $I_{q\_m}^*$ and the q-axis current $i_{q\_m}$, to determine the q-axis voltage command value $v_q^*$.

Incidentally, the voltage command generator 109 and the ripple compensation controller 110 may be of any configuration as long as they have similar functions.

By performing the control described above, it is possible to drive the first motor 41 and the second motor 42 by the single inverter 4, in such a manner that no ripple occurs in the second motor 42.

Next, description will be made of problems associated with a situation in which the first motor 41 and the second motor 42 are interior magnet synchronous motors.

Figure 4:
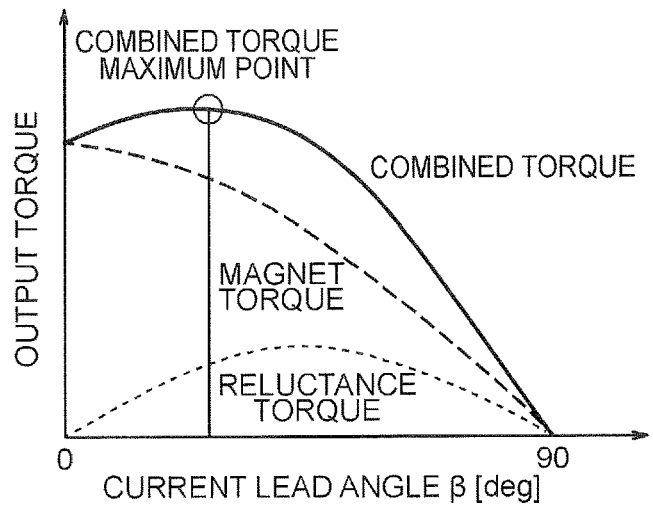
FIG. 4 is a diagram showing the relation between a current lead angle, magnet torque, reluctance torque, and combined torque.

The interior magnet synchronous motors generate reluctance torque due to the difference between the d-axis inductance and the q-axis inductance, in addition to the magnet torque due to the magnets. The relations between the current lead angle β, and the magnet torque and the reluctance torque are, for example, as shown in FIG. 4, and the combined torque is at a maximum when the current lead angle β is at a certain angle between 0 to 90 [deg].

Here, the current lead angle β is a phase angle of the current with respect to the direction of the counter electromotive force, that is, the +q-axis, and, within the range of from 0° to 90°, the current lead angle β is increased by increasing the absolute value of the d-axis current, if the q-axis current is constant.

In the case of a surface magnet synchronous motor, there is just magnet torque, so that the combined torque is at a maximum when the current lead angle β is 0 [deg].

Patent reference 1 proposes a method in which the current is made larger by increasing the current lead angle β for restraining the hunting vibration. In the case of an interior magnet synchronous motor, when the current lead angle β is increased, the combined torque turns to decrease after assuming its maximum. Accordingly, the current is decreased until the combined torque becomes maximum, and is increased beyond the maximum point. The reduction of the current may lead to ripple, which may lead to stopping of the operation due to the excessive current.

Figure 5:
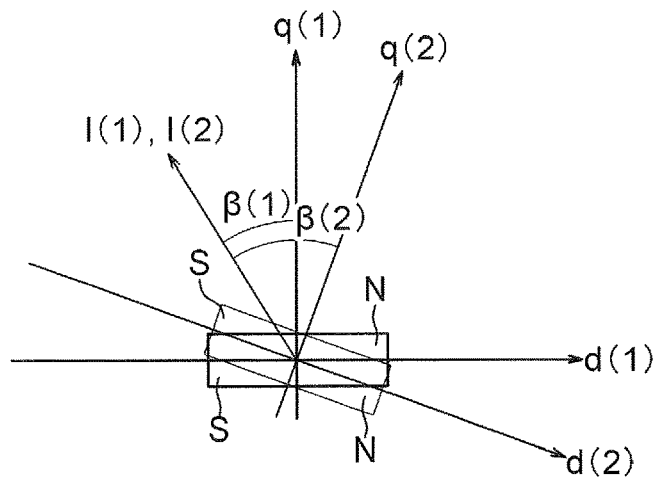
FIG. 5 is a diagram showing the difference in a lead angle in a case in which there is a difference in rotation phase between two motors.

Moreover, when there is a difference in the operation condition between the first motor 41 and the second motor 42, step-out may occur. This will be explained with reference to FIG. 5. In FIG. 5, d(1), q(1) denote the d-axis and the q-axis of the first motor 41, d(2), q(2) denote the d-axis and the q-axis of the second motor 42, and the rotation phase of the second motor 42 is lagging behind that of the first motor 41. In this case, if the values of the currents (I(1), I(2)) flowing through the two motors 41, 42 are equal, the current lead angle β(2) of the second motor 42 is larger than the current lead angle β(1) of the first motor 41.

If the current lead angle β(1) of the first motor 41 is at an angle at which the combined torque assumes its maximum, the output torque of the second motor 42 is smaller than that of the first motor 41 because the current lead angle β(2) of the second motor 42 is larger than the current lead angle β(1). As a result, delay in the rotation phase may increase, resulting in step-out of the second motor 42.

Therefore, when the first motor 41 and the second motor 42 are driven, advancing the current phase, as disclosed in Patent reference 1, does not necessarily prevent step-out. As described above, according to the present embodiment, the current phase is adjusted by the ripple compensation controller 110, using the phase information, so as to make it possible to match the rotation phases of the first motor 41 and the second motor 42 with each other.

Figure 6A:
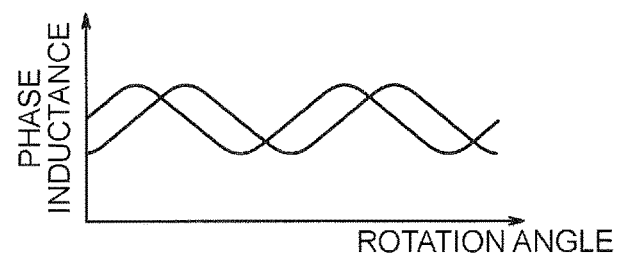
FIGS. 6(a) and 6(b) are waveform diagrams showing a phase inductance and an induced voltage in a case in which there is a difference in the rotation phase between two motors.
Figure 6B:
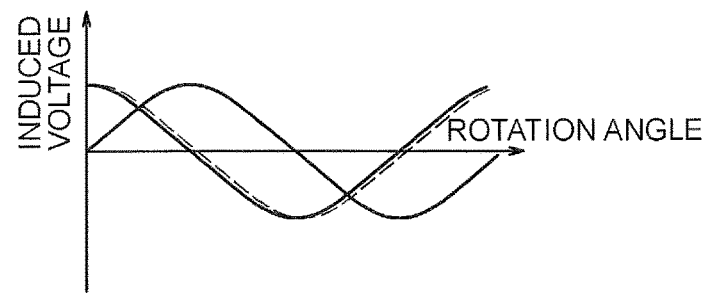

If the first motor 41 and the second motor 42 are motors of the same specification, in a state in which the rotation phases are not identical, the phase inductance of the first motor 41 and the phase inductance of the second motor 42 differ in phase, although their maximum and minimum values are the same, as shown in FIG. 6(a), and the induced voltage of the first motor 41 and the induced voltage of the second motor 42 differ in phase, although their amplitudes are the same, as shown in FIG. 6(b). Incidentally, the horizontal axes in FIGS. 6(a) and 6(b), as well as in FIGS. 7(a) and 7(b), to be referred to later, represent a rotation angle. The dotted lines in FIG. 6(b) and FIG. 7(b) represent an output voltage tone of output voltages Vou, Vov, Vow) of the inverter 4.

Figure 7A:
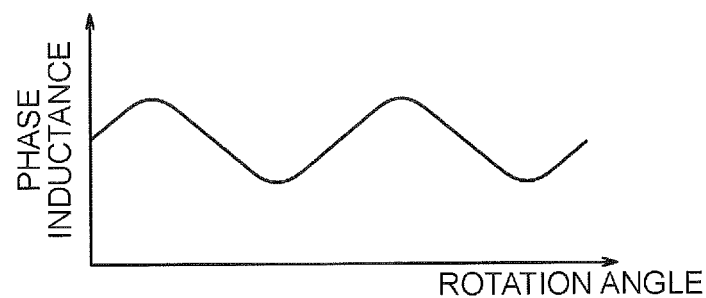
FIGS. 7(a) and 7(b) are waveform diagrams showing a phase inductance and an induced voltage in a case in which the rotation phases match between two motors.

In contrast, in a state in which the rotation phases are identical, the phases as well as the maximum and minimum values of the phase inductance of the first motor 41 and the phase inductance of the second motor 42 are the same, as shown in FIG. 7(a). That the phases are the same means that the variations in the inductance with respect to the rotation angle are the same with each other. The state in which the phases as well as the maximum and minimum values are the same is expressed as a state in which the phase inductance of the first motor 41 and the phase inductance of the second motor are identical. In the state in which the phase inductances are identical, the inductances for each rotation angle are equal to each other. In such a state, the impedance as seen from the inverter 4 towards the motors is half that in the situation in which just one of the first motor 41 and the second motor 42 is connected.

Figure 7B:
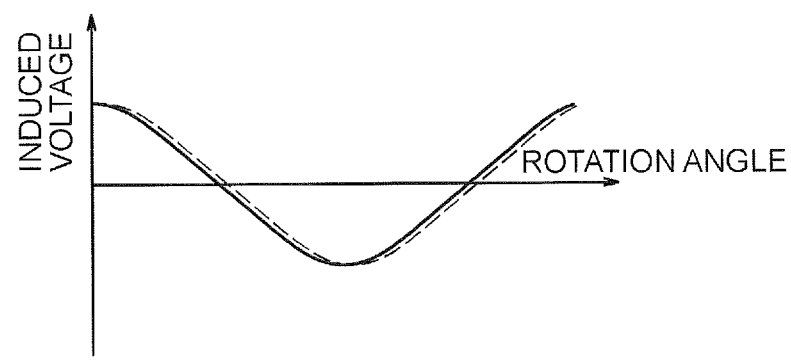

Also, the phases as well as the amplitudes of the induced voltages of the motors will be the same, as shown in FIG. 7(b). As a result, the current flowing through the first motor 41 and the current flowing through the second motor 42 will become substantially equal. Therefore, heat generation becomes about equal between the two motors, making it possible to restrain abnormal heat generation in one of the motors.

If, in a state in which the rotation phases of the first motor 41 and the second motor 42 are different, the switching elements of the upper arms of the inverter 4 are all turned ON, or the switching elements of the lower arms of the inverter 4 are all turned ON, or the switching elements of the upper arms and the lower arms of the inverter 4 are all turned OFF, undesirable torque may be generated due to current flow due to the difference in the induced voltage between the first motor 41 and the second motor 42, disrupting the operation.

However, the above-mentioned incident can be avoided if the controller 10 operates such that the rotation phases are identical, and the impedance as seen from the inverter 4 towards the motors is reduced to half.

Incidentally, in the above-described embodiment, the phase currents of the second motor 42 are obtained by subtracting the phase currents of the first motor 41 from the phase currents of the inverter. However, as mentioned above, a motor current detector similar to the motor current detector 6 may be provided also for the second motor 42.

Also, in the above-described embodiment, the switch 9 is provided only for the second motor 42. However, a switch similar to the switch 9 may also be provided between the first motor 41 and the inverter 4. In this case, the switch provided for the first motor 41 and the switch provided for the second motor 42 in combination form the connection switching device.

Second Embodiment

So far, description has been made for a case in which the number of the motors which can be driven by the inverter 4 is two. However, the number of the motors which can be driven may be three or more. Where the number of the motors which can be driven is four, the motor driving apparatus may be configured, for example, as shown in FIG. 8.

Figure 8:
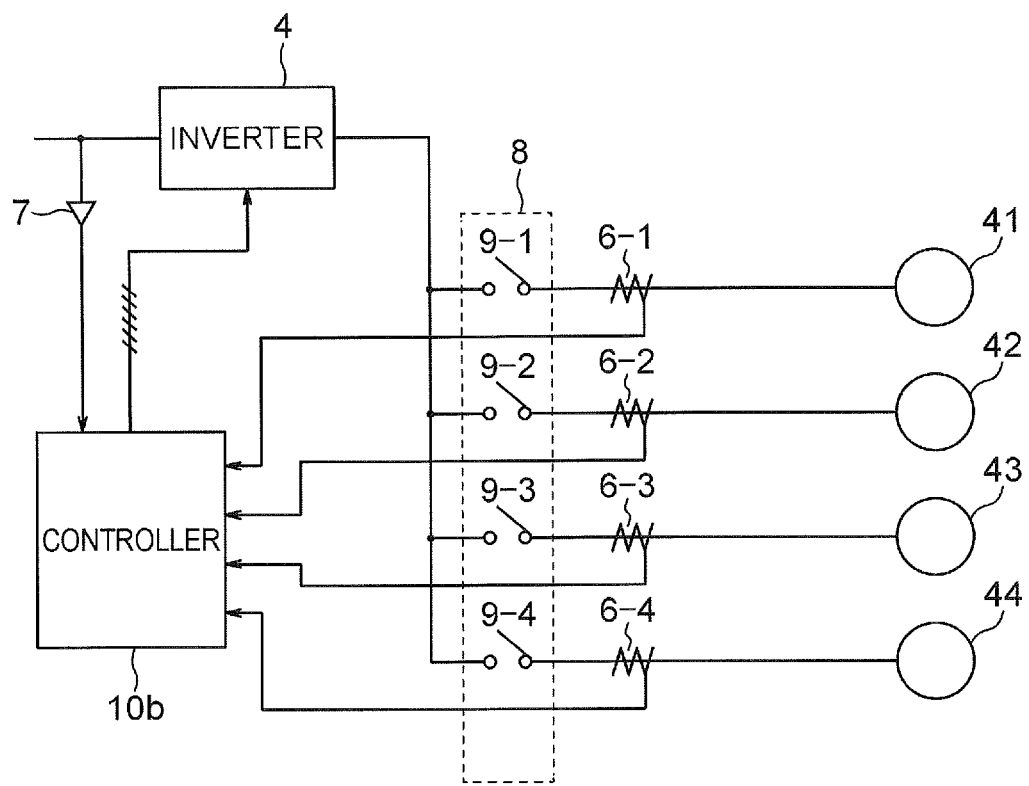
FIG. 8 is a diagram showing an example of a configuration of a motor driving apparatus of a second embodiment of the present invention.

In FIG. 8, illustration of part of the motor driving apparatus for supplying DC power to the inverter 4, that is, the rectifier 2 and the smoothing circuit 3 in FIG. 1, is omitted, and illustration of the AC power supply 1 is also omitted.

In the configuration shown in FIG. 8, the output of the inverter 4 is connected via switches 9-1 to 9-4, to motors 41 to 44. Motor current detectors 6-1 to 6-4 are provided, respectively, between the switches 9-1 to 9-4 and the motors 41 to 44. Moreover, in place of the controller 10, a controller 10b is provided.

Currents detected by the motor current detectors 6-1 to 6-4 are inputted to the controller 10b.

Each of the motor current detectors 6-1 to 6-4 is similar to the motor current detector 6 in FIG. 1.

Similarly to the motor current detector 6 in FIG. 1, the motor current detector 6-1 detects the phase currents $i_{u\_m}$, $i_{v\_m}$, $i_{w\_m}$ of the first motor 41. The motor current detector 6-2 detects phase currents $i_{u\_sl2}$, $i_{v\_sl2}$, $i_{w\_sl2}$ of the second motor 42. The motor current detector 6-3 detects phase currents $i_{u\_sl3}$, $i_{v\_sl3}$, $i_{w\_sl3}$ of the third motor 43. The motor current detector 6-4 detects phase currents $i_{u\_sl4}$, $i_{v\_sl4}$, $i_{w\_sl4}$ of the fourth motor 44.

The controller 10b is generally identical to the controller 10 in FIG. 2, but differs in the following respects.

Figure 9:
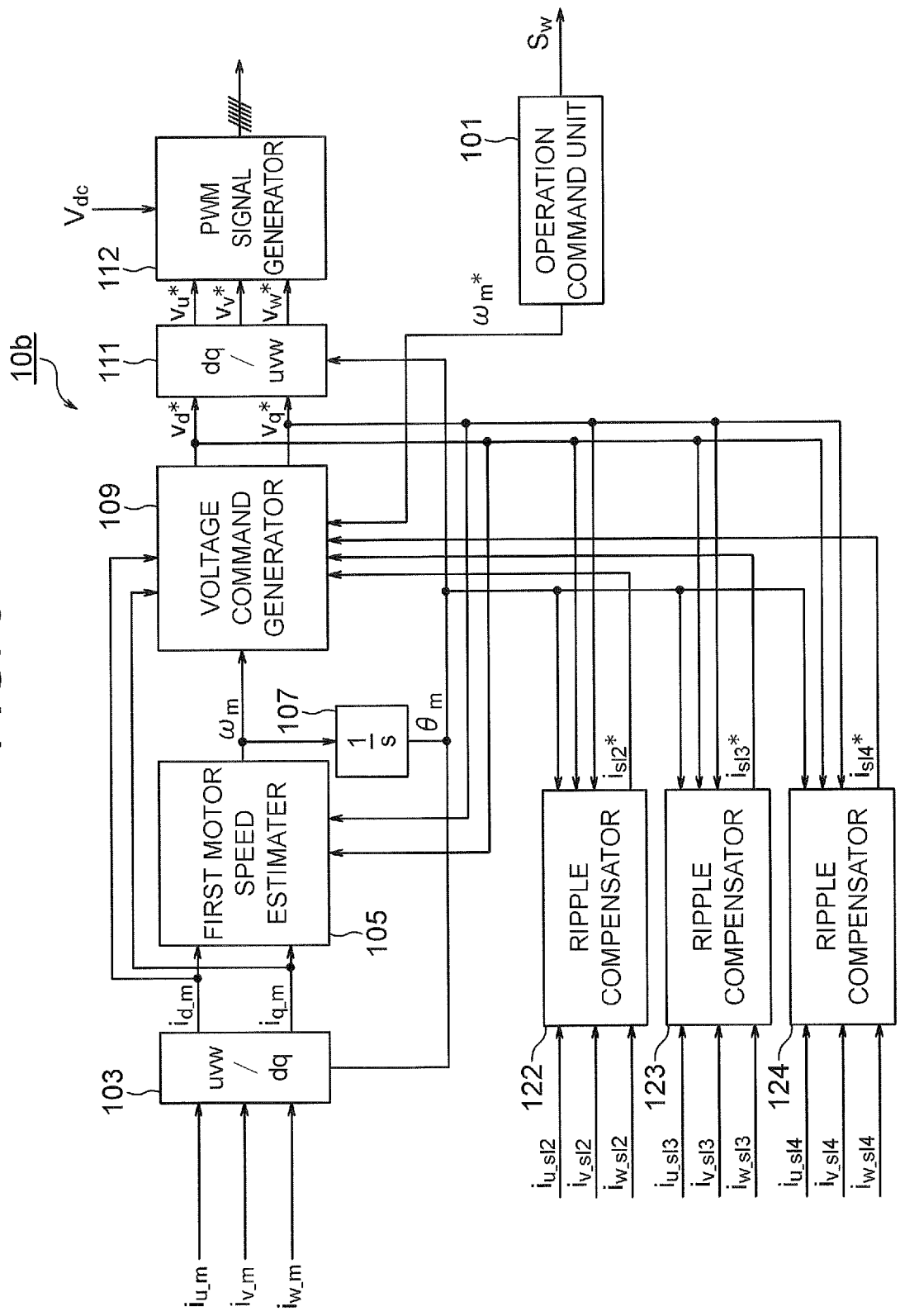
FIG. 9 is a functional block diagram showing an example of a configuration of a controller in FIG. 8.

For example, the controller 10b is configured as shown in FIG. 9.

In FIG. 9, ripple compensators 122, 123, 124 are provided respectively for the second, third, and fourth motors 42, 43, 44, and each of the ripple compensators 122, 123, 124 includes components similar to the coordinate converter 104, the motor speed estimator 106, the integrator 108, and the ripple compensation controller 110 in FIG. 2, generates a ripple compensation current command value for the corresponding motor, based on the dq-axis voltage command values $v_d^*$, $v_q^*$ and the phase currents of the corresponding motor, calculates dq-axis currents by performing coordinate conversion of the phase currents of the corresponding motor, and calculates a rotational speed estimated value of the corresponding motor, based on the calculated dq-axis currents, and the dq-axis voltage command values $v_d^*$, $v_q^*$. For the coordinate conversion, a phase estimated value (magnetic pole position estimated value) of the corresponding motor is used.

For example, the ripple compensator 122 generates the ripple compensation current command value $i_{sl2}^*$ pertaining to the second motor 42, based on the phase currents $i_{u\_sl2}$, $i_{v\_sl2}$, $i_{w\_sl2}$ of the second motor 42. The ripple compensator 122 also determines the dq-axis currents $i_{d\_sl2}$, $i_{q\_sl2}$ of the second motor 42, by performing coordinate conversion of the phase currents $i_{u\_sl2}$, $i_{v\_sl2}$, $i_{w\_sl2}$ of the second motor 42, using the phase estimated value $\theta_{sl2}$, and estimates the rotational speed estimated value $\omega_{sl2}$ of the second motor 42, based on the dq-axis currents $i_{d\_sl2}$, $i_{q\_sl2}$ and the dq-axis voltage command values $v_d^*$, $v_q^*$.

Similarly, the ripple compensator 123 generates the ripple compensation current command value $i_{sl3}^*$ pertaining to the third motor 43, based on the phase currents $i_{u\_sl3}$, $i_{v\_sl3}$, $i_{w\_sl3}$ of the third motor 43. The ripple compensator 123 also determines the dq-axis currents $i_{d\_sl3}$, $i_{q\_sl3}$ of the third motor 43, by performing coordinate conversion of the phase currents $i_{u\_sl3}$, $i_{v\_sl3}$, $i_{w\_sl3}$ of the third motor 43, using the phase estimated value $\theta_{sl3}$, and estimates the rotational speed estimated value $\omega_{sl3}$ of the third motor 43, based on the dq-axis currents $i_{d\_sl3}$, $i_{q\_sl3}$ and the dq-axis voltage command values $v_d^*$, $v_q^*$.

Similarly, the ripple compensator 124 generates the ripple compensation current command value $i_{sl4}^*$ pertaining to the fourth motor 44, based on the phase currents $i_{u\_sl4}$, $i_{v\_sl4}$, $i_{w\_sl4}$ of the fourth motor 44. The ripple compensator 124 also determines the dq-axis currents $i_{d\_sl4}$, $i_{q\_sl4}$ of the fourth motor 44, by performing coordinate conversion of the phase currents $i_{u\_sl4}$, $i_{v\_sl4}$, $i_{w\_sl4}$ of the fourth motor 44, using the phase estimated value $\theta_{sl4}$, and estimates the rotational speed estimated value $\omega_{sl4}$ of the fourth motor 44, based on the dq-axis currents $i_{d\_sl4}$, $i_{q\_sl4}$ and the dq-axis voltage command values $v_d^*$, $v_q^*$.

The voltage command generator 109 calculates the dq-axis voltage command values $v_d^*$, $v_q^*$ based on the dq-axis current $i_{d\_m}$, $i_{q\_m}$, the rotational speed estimated value $\omega_m$, and the ripple compensation current command values $i_{sl2}^*$, $i_{sl3}^*$, $i_{sl4}^*$.

In the generation of the dq-axis voltage command values $v_d^*$, $v_q^*$ by the voltage command generator 109, the ripple compensation current command values $i_{sl2}^*$, $i_{sl3}^*$, $s_{l4}^*$ generated by the ripple compensators 122, 123, 124 are used, so that control is so made that the rotation phases of the four motors 41 to 44 become identical.

In a state in which the rotation phases of the four motors 41 to 44 are identical, the phase inductances of the four motors are identical with each other, so that the impedance as seen from the inverter 4 towards the motors is one fourth compared with a case in which a single motor is connected, and the induced voltages generated by the four motors are equal to each other.

The operation command unit 101 pertains control over the connection switching device 8. The control over the connection switching device 8 includes control over the switches 9-1 to 9-4.

The connection switching device 8 can connect arbitrary ones of the motors 41 to 44 to the inverter 4. Accordingly, the connection switching device 8 can change the number of the motors connected to the inverter 4.

If the rotation phases of the motors are identical with each other, the impedance as seen from the inverter 4 towards the motors is inversely proportional to the number of the motors connected to the inverter 4. The controller 10b performs such control that the impedance as seen from the inverter 4 towards the motors is inversely proportional to the number of the motors connected to the inverter 4. That is, the controller 10b performs control such that the motors have the phase relation by which the impedance as seen from the inverter 4 towards the motors is inversely proportional to the number of the motors connected to the inverter 4. This control is achieved by adjustment of the output voltages Vou, Vov, Vow of the inverter 4.

Incidentally, in the above-described example, the motor current detectors are provided for all of the four motors. However, the motor current detectors may be provided for three of the motors, and the phase currents of the remaining motor may be calculated by subtracting the phase currents of the three motors from the phase currents of the inverter 4.

Also, in the above-described example, the switches are provided for all the motors. However, the switches may be provided for three of the motors, and the switch may not be provided for the remaining motor.

Description has been made of a case in which the number of the motors which can be driven by the inverter is four. However, a similar configuration can be used for cases where the number of the motors is other than four.

To generalize, what is required is that the motor driving apparatus is configured to comprise:

an inverter which can drive n motors each having a permanent magnet in its rotor; and a connection switching device for switching a connection state of the n motors; wherein the connection switching device is operated to change the number of the motors connected to the inverter so as to change the impedance as seen from the inverter towards the motors.

It is desirable that the impedance as seen from the inverter towards the motors is inversely proportional to the number of the motors connected to the inverter.

It is desirable that the motor driving apparatus further comprises a controller for controlling the inverter and the connection switching device, and when i (i being any of 2 to n) motors among the n motors are concurrently driven by the inverter, output voltages Vou, Vov, Vow of the inverter are so controlled that the phase inductance values of the i motors are identical to each other.

Also, it is desirable that the motor driving apparatus further comprises a controller for controlling the inverter and the connection switching device, and when j (j being any of 2 to n) motors among the n motors are concurrently braked by the inverter, switching to braking operation is made after output voltages Vou, Vov, Vow of the inverter are so controlled that the phase inductance values of the j motors become identical to each other.

When the number of the motors which can be driven by the inverter is n, description similar to that given in connection with the second embodiment is also applicable. That is, the switches may be provided for all of the n motors, or alternatively, the switches may be provided for (n−1) motors, with no switch being provided for the remaining motor.

Also, similarly to the description given in connection with the second embodiment, the motor current detectors may be provided for all of the n motors, or alternatively the motor current detectors may be provided only for (n−1) motors, and the current for the remaining motor may be determined by subtracting the phase currents of the other motors from the phase currents of the inverter 4.

When a plurality of motors are connected, the wiring length from the inverter 4 to each motor may differ, so that the inductance may differ. Generally, the impedance of the motor is dominant compared with the impedance of the wiring, so that the effect due to the difference in the wiring length is small. However, by presetting the motor parameters taking account of the wiring length in the controller 10 or 10b, the control performance is further improved.

Also, the resistance values and the inductance values of the windings may vary due to manufacturing variations or the temperature characteristic. There are considerable temperature variations in the resistance values. But in a state in which the motor is rotating, the impedance due to the inductance is dominant, and the effect of the resistance is relatively small. The manufacturing variation of the inductance is about 10%, so that when control is so made as to achieve the phase relation by which the impedance as seen from the inverter 4 towards the motors is inversely proportional to the number of the motors connected to the inverter 4, the effect of the variation of the inductance to the above-mentioned degree is very small.

Next, the operation of the connection switching device 8 will be described.

For example, in the configuration shown in FIG. 1, if the switch 9 is open, the inverter 4 applies the voltages only to the first motor 41, so that only the first motor 41 is driven to rotate.

If the switch 9 is closed while the first motor 41 is driven, the second motor 42, which has been at a standstill, may be unable to follow the AC voltages Vou, Vov, Vow outputted by the inverter 4, and may fail to start. Therefore, the switch 9 is closed after the rotational speed of the first motor 41 is sufficiently lowered, or the switch 9 is closed after the first motor 41 is stopped tentatively, so that the output voltages Vou, Vov, Vow of the inverter 4 are applied to the first motor 41 and the second motor 42, thereby to restart the first motor 41, and start the second motor 42.

Next, description will be made of a case in which, from a state in which the switch 9 is closed, and the first motor 41 and the second motor 42 are driven, the switch 9 is opened to stop the second motor 42, while continuing the operation of the first motor 41.

If the switch 9 is opened while the second motor 42 is driven, the path of the current which has been flowing through the second motor 42 is suddenly interrupted. As a result, a voltage which is dependent on the current having been flowing through the inductance of the second motor 42 is generated, and the switch 9 may be damaged.

For example, if the switch 9 is a mechanical relay, and the switch 9 is opened while the current is flowing, contact welding due to arc discharge may be caused. Such an incident can be avoided by opening the switch 9 in a state in which the rotational speed of the second motor 42 is sufficiently low (including a state in which the motor is at a standstill), or by opening the switch 9 in a state in which the current flowing through the second motor 42 is controlled to be zero by means of the controller 10.

Furthermore, in a state in which the switch 9 is closed, and the first motor 41 and the second motor 42 are driven, if the controller 10 causes the switching operation of the inverter 4 to stop, or causes all the switching elements of the upper arms of the inverter 4 to be ON simultaneously, or causes all the switching elements of the lower arms of the inverter 4 to be ON simultaneously, the first motor 41 and the second motor 42 will be in a state in which they are mutually connected and in which the first motor 41 and the second motor 42 are generating induced voltages. In this case, because of the difference in the induced voltage, a current will flow between the two motors, and the rotation energy will be dissipated as heat, generating braking force, making it possible to stop the two motors.

However, if there is a rotation phase difference between the two motors, an excessive current may flow due to the difference in the induced voltage, causing irreversible demagnetization of the permanent magnets in the motors. By exercising the control to achieve the phase relation by which the impedance as seen from the inverter towards the motors is in inversely proportional to the number of the motors connected to the inverter 4, as mentioned above, the phases of the induced voltages of the first motor 41 and the second motor 42 will become identical, so that it is possible to prevent the excessive current due to the difference in the induced voltage from flowing, while, at the same time, applying braking force to the two motors, thereby to safely stop the motors.

To generalize, when the number of the motors which can be connected to the inverter 4 is n, by exercising such control as to achieve the phase relation by which the impedance as seen from the inverter 4 towards the motors is inversely proportional to the number of the motors connected to the inverter 4, the phases of the induced voltages of the n motors will become identical, so that it is possible to prevent an excessive current due to the difference in the induced voltage from flowing, while, at the same time, applying braking force to the n motors, thereby to safely stop the motors.

Third Embodiment

In the third embodiment, an example of a circuit configuration of a heat pump apparatus will be described.

Figure 10:
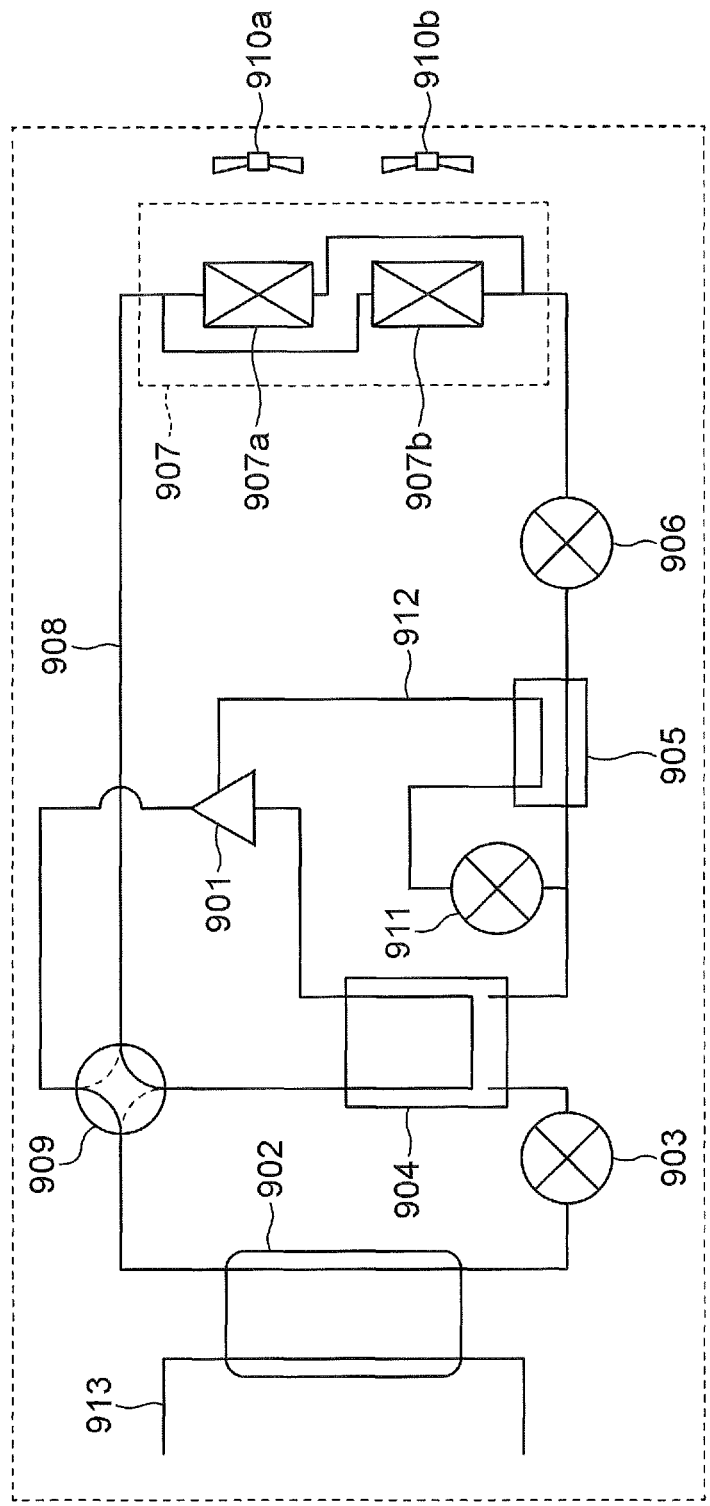
FIG. 10 is a circuit configuration diagram showing a heat pump apparatus of a third embodiment of the present invention.

FIG. 10 is a circuit configuration diagram of a heat pump apparatus 900 according to the third embodiment.

Figure 11:
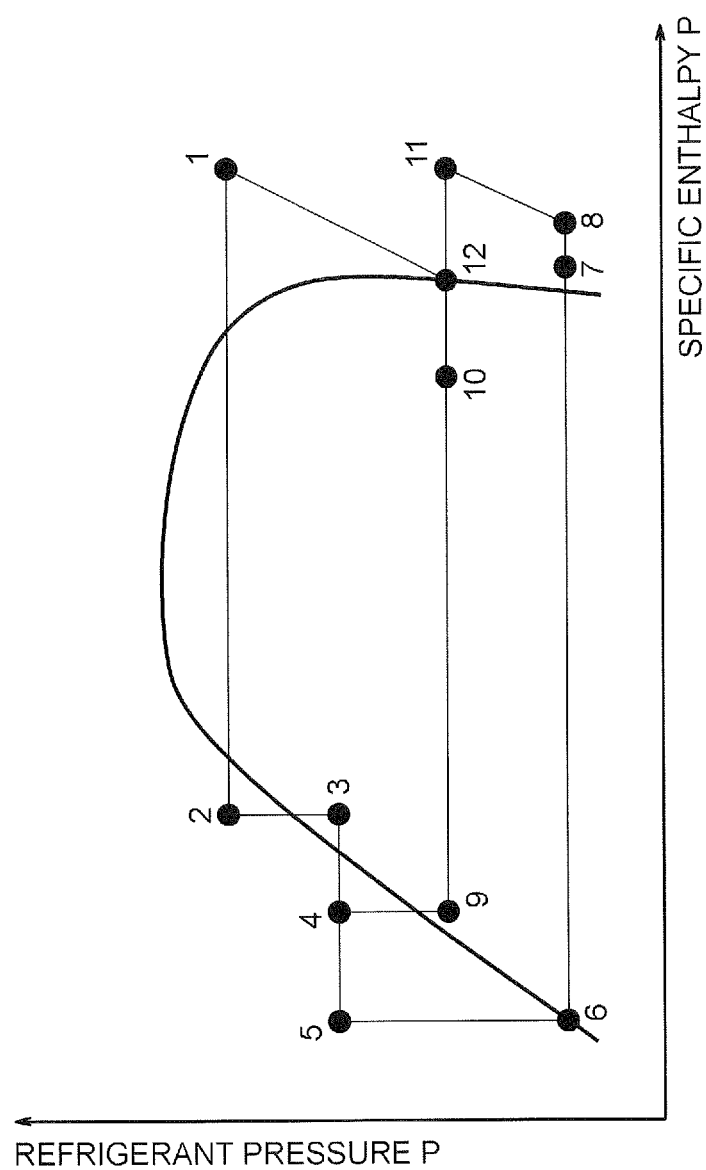
FIG. 11 is a Mollier chart showing the state of a refrigerant in the heat pump apparatus shown in FIG. 10.

FIG. 11 is a Mollier chart concerning the state of a refrigerant in the heat pump apparatus 900 shown in FIG. 10. In FIG. 11, the horizontal axis represents a specific enthalpy, while the vertical axis represents a refrigerant pressure.

The heat pump apparatus 900 includes a main refrigerant circuit 908 in which a compressor 901, a heat exchanger 902, an expansion mechanism 903, a receiver 904, an internal heat exchanger 905, an expansion mechanism 906, and a heat exchanger 907 are sequentially connected by piping, and through which the refrigerant circulates. Incidentally, in the main refrigerant circuit 908, a four-way valve 909 is provided on the discharge side of the compressor 901, to change the direction of the circulation of the refrigerant.

The heat exchanger 907 has a first part 907a and a second part 907b, to which valves, not shown, are connected, to control the flow of the refrigerant according to the load of the pump apparatus 900. For example, when the load of the heat pump apparatus 900 is relatively high, the refrigerant is made to flow through both of the first part 907a and the second part 907b. When the load of the heat pump apparatus 900 is relatively low, the refrigerant is made to flow through just one of the first part 907a and the second part 907b, for example, only the first part 907a.

Fans 910a and 910b are provided corresponding to the first part 907a and the second part 907b, and are disposed respectively near the corresponding parts. The fans 910a and 910b are driven by separate motors. For example, the motors 41 and 42 described in the first embodiment or the second embodiment are used to drive the fans 910a and 910b, respectively.

Furthermore, the heat pump apparatus 900 is provided with an injection circuit 912 connecting, by means of piping, from between the receiver 904 and the internal heat exchanger 905 to an injection pipe of the compressor 901. Connected sequentially in the injection circuit 912 are an expansion mechanism 911, and the internal heat exchanger 905.

Connected to the heat exchanger 902 is a water circuit 913 for circulating water. Connected to the water circuit 913 is a device utilizing water, such as hot water supply equipment, a radiator, a heat radiator of floor heating or the like.

First, the operation at the time of heating operation of the heat pump apparatus 900 will be described. At the time of the heating operation, the four-way valve 909 is set in the direction of the solid lines. Here, the heating operation includes not only heating used in air conditioning, but also water heating for hot water supply.

A gas-phase refrigerant (point 1 in FIG. 11) having been made to have a high temperature and a high pressure at the compressor 901 is discharged from the compressor 901, and is liquefied (point 2 in FIG. 11) by heat exchange at the heat exchanger 902 serving as a condenser and a heat radiator. By the heat transferred from the refrigerant, water circulating in the water circuit 913 is heated, and used for heating for the purpose of air conditioning, water heating, or the like.

The liquid-phase refrigerant liquefied at the heat exchanger 902 is turned into a gas-liquid two-phase state (point 3 in FIG. 11) by decompression at the expansion mechanism 903. The refrigerant which has been turned into the gas-liquid two-phase state at the expansion mechanism 903 is cooled and liquefied (point 4 in FIG. 11) by heat exchange at the receiver 904, with the refrigerant to be drawn into the compressor 901. The liquid-phase refrigerant liquefied at the receiver 904 branches and flows into the main refrigerant circuit 908 and the injection circuit 912.

The liquid-phase refrigerant flowing in the main refrigerant circuit 908 is further cooled (point 5 in FIG. 11) by heat exchange at the internal heat exchanger 905 with the refrigerant flowing in the injection circuit 912 after being turned into the gas-liquid two-phase state by decompression at the expansion mechanism 911. The liquid-phase refrigerant having been cooled at the internal heat exchanger 905 is turned into the gas-liquid two-phase state (point 6 in FIG. 11) by decompression at the expansion mechanism 906. The refrigerant having been turned into the gas-liquid two-phase state at the expansion mechanism 906 is heated (point 7 in FIG. 11) by heat exchange with the outdoor air at the heat exchanger 907 serving as an evaporator.

The refrigerant heated at the heat exchanger 907 is further heated (point 8 in FIG. 11) at the receiver 904, and is drawn into the compressor 901.

The refrigerant flowing in the injection circuit 912 is decompressed (point 9 in FIG. 11), at the expansion mechanism 911, as described above, and exchanges heat (point 10 in FIG. 11) at the internal heat exchanger 905. The refrigerant (injection refrigerant) in the gas-liquid two-phase state having exchanged heat at the internal heat exchanger 905 flows from the injection pipe of the compressor 901 into the compressor 901, while keeping the gas-liquid two-phase state.

In the compressor 901, the refrigerant (point 8 in FIG. 11) having been drawn from the main refrigerant circuit 908 is compressed and heated (point 11 in FIG. 11) up to an intermediate pressure.

The refrigerant (point 11 in FIG. 11) having been compressed and heated to the intermediate pressure, merges with the injection refrigerant (point 10 in FIG. 11), so that its temperature is lowered (point 12 in FIG. 11). The refrigerant with its temperature lowered (point 12 in FIG. 11) is further compressed and heated to have a high temperature and a high pressure, and is discharged (point 1 in FIG. 11).

When the injection operation is not performed, the opening degree of the expansion mechanism 911 is set to "full close". That is, when the injection operation is performed, the opening degree of the expansion mechanism 911 is larger than a certain value. When the injection operation is not performed, the opening degree of the expansion mechanism 911 is smaller than the above-mentioned certain value. As a result, the refrigerant is prevented from flowing into the injection pipe of the compressor 901.

The opening degree of the expansion mechanism 911 is electronically controlled by a controller formed for example of a microcomputer.

Next, the operation at the time of cooling operation of the heat pump apparatus 900 will be described. At the time of the cooling operation, the four-way valve 909 is set in the direction of the broken lines. Here, the cooling operation includes not only cooling used in the air conditioning, but also cooling of water, freezing of foods, and the like.

A gas-phase refrigerant (point 1 in FIG. 11) having been made to have a high temperature and a high pressure at the compressor 901 is discharged from the compressor 901, and is liquefied (point 2 in FIG. 11) by heat exchange at the heat exchanger 907 serving as a condenser and a heat radiator. The liquid-phase refrigerant having been liquefied at the heat exchanger 907 is decompressed at the expansion mechanism 906 and is turned into the gas-liquid two-phase state (point 3 in FIG. 11). The refrigerant having been turned into the gas-liquid two-phase state at the expansion mechanism 906 is cooled and liquefied (point 4 in FIG. 11) by heat exchange at the internal heat exchanger 905. At the internal heat exchanger 905, heat exchange is performed between the refrigerant having been turned into the gas-liquid two-phase state at the expansion mechanism 906, and the refrigerant (point 9 in FIG. 11) in the gas-liquid two-phase state obtained by decompressing, at the expansion mechanism 911, the liquid-phase refrigerant having been liquefied at the internal heat exchanger 905. The liquid-phase refrigerant (point 4 in FIG. 11) having exchanged heat at the internal heat exchanger 905 branches and flows into the main refrigerant circuit 908 and the injection circuit 912.

The liquid-phase refrigerant flowing in the main refrigerant circuit 908 is further cooled (point 5 in FIG. 11) by heat exchange at the receiver 904 with the refrigerant to be drawn into the compressor 901. The liquid-phase refrigerant having been cooled at the receiver 904 is decompressed at the expansion mechanism 903 and is turned into the gas-liquid two-phase state (point 6 in FIG. 11). The refrigerant having been turned into the gas-liquid two-phase state at the expansion mechanism 903, is heated (point 7 in FIG. 11) by heat exchange at the heat exchanger 902 serving as an evaporator. By the action of heat absorption by the refrigerant, water circulating the water circuit 913 is cooled, and used for cooling for the purpose of air conditioning, cooling for other purposes, freezing or the like.

The refrigerant having been heated at the heat exchanger 902 is further heated (point 8 in FIG. 11) at the receiver 904, and is drawn into the compressor 901.

The refrigerant flowing in the injection circuit 912 is decompressed (point 9 in FIG. 11) at the expansion mechanism 911, as described above, and exchanges heat (point 10 in FIG. 11) at the internal heat exchanger 905. The refrigerant (injection refrigerant) in the gas-liquid two-phase state having exchanged heat at the internal heat exchanger 905 flows in from the injection pipe of the compressor 901, while keeping the gas-liquid two-phase state.

The compression operation in the compressor 901 is the same as in the heating operation.

Incidentally, when the injection operation is not performed, the opening degree of the expansion mechanism 911 is set to "full close", as in the case of the heating operation, so that the refrigerant is prevented from flowing into the injection pipe of the compressor 901.

Also, in the above-described example, description has been made on the assumption that the heat exchanger 902 is one like a plate-type heat exchanger in which heat exchange is performed between the refrigerant and water circulating the water circuit 913. This does not impose any limitation, and the heat exchanger 902 may be one in which heat exchange is performed between the refrigerant and air.

Also, the water circuit 913 is not limited to a circuit in which water is circulated, but may be one in which some other fluid is circulated.

In the above-described example, the heat exchanger 907 has a first part 907*a* and a second part 907*b*. As an alternative, or in addition, the configuration may be such that the heat exchanger 902 has two parts. Where the heat exchanger 902 performs heat exchange between the refrigerant and air, the configuration may be such that the two parts have fans, respectively, and the fans are driven by separate motors.

Description has been made of a configuration in which the heat exchanger 902 or 907 has two parts. As an alternative, or in addition, the configuration may be such that the compressor 901 has a first part (first compression mechanism) and a second part (second compression mechanism). In such a case, control is so made that, when the load of the heat pump apparatus 900 is relatively high, both of the first part and the second part perform the compression operation, while when the load of the heat pump apparatus 900 is relatively low, only one of the first part and the second part, for example, only the first part, performs the compression operation.

In the case of such a configuration, the first part and the second part of the compressor 901 are provided with separate motors for driving them. For example, the motors 41 and 42 explained in the first embodiment or the second embodiment are respectively used for driving the first part and the second part.

So far, description has been made of cases in which at least one of the heat exchangers 902 and 907 has two parts, and two fans are provided for at least one of the heat exchangers 902 and 907. A configuration in which a heat exchanger has three or more parts is also conceivable. To generalize, a configuration is conceivable in which at least one of the heat exchangers 902 and 907 has a plurality of parts, fans are provided for the respective parts, and motors are provided for the respective fans. In such a case, the plurality of motors can be driven by a single inverter by using the motor driving apparatus explained in the first embodiment or the second embodiment.

Description has been made of cases in which the compressor 901 has two parts. A configuration in which the compressor 901 has three or more parts is conceivable. To generalize, a configuration is conceivable in which the compressor 901 has a plurality of parts, and motors are provided for the respective parts. In such a case, the plurality of motors can be driven by a single inverter by using the motor driving apparatus explained in the first embodiment or the second embodiment.

Refrigeration cycle equipment can be configured by combining the heat pump apparatus explained in the third embodiment and the motor driving apparatus explained in the first embodiment or the second embodiment.

As has been described above, by applying the configuration described in the first embodiment or the second embodiment, in a situation in which there are a plurality of motors for driving the compressor 901, or the fans of the heat exchanger 902 or 907 in the third embodiment, it is possible to drive the plurality of motors by means of a single inverter 4, and it is possible to reduce the cost and the size and weight of the motor driving apparatus.

Also, when the motors are used for driving the fans of the heat exchanger, the reduction in the size of the motor driving apparatus allows increase in the size of the heat exchanger, which in turn enables improvement in the heat exchange rate, and therefore improvement in efficiency.

Also, because the number of the motors driven by the inverter 4 can be adjusted by the operation of the switches (9, 9-1 to 9-4), it is possible to perform such a control that when the load is relatively low, some only of the plurality of motors, e.g., only the first motor 41, is driven, while when the load is relatively high, a greater number of the motors, e.g., both of the first motor 41 and the second motor 42, are driven. By changing the number of the driven motors according to the load, the number of the motors driven at each moment is kept to a minimum, and the efficiency of the heat pump apparatus can be further improved.

When the control explained in the first embodiment or the second embodiment is applied to the motors for driving the compressor 901, the possibility of step-out is eliminated, so that stable compression operation can be continued, and vibrations due to the current ripples can be restrained, so that it is possible to reduce noise, and prevent the piping or the like forming the main refrigerant circuit 908 from being damaged due to vibrations.

Furthermore, when the control explained in the first embodiment or the second embodiment is applied to the motors for driving the fans of the heat exchangers 902 or 907, possibility of step-out is eliminated, so that stable heat exchange operation can be continued. It is also possible to restrain vibrations due to the current ripples, and prevent generation of difference tones due to the difference in the speed between the fans, thereby reducing noises.

Fourth Embodiment

In the refrigeration cycle equipment formed of a combination of the motor driving apparatus of the first embodiment or the second embodiment, and the heat pump apparatus of the third embodiment, responsive to the change in the load of the refrigeration cycle equipment, i.e., the load of the heat pump apparatus, the operation mode of the heat pump apparatus is changed, and a part or parts of the compressor or the heat exchanger which perform the compression operation or the heat exchange operation are changed accordingly, and the number of the driven motors is changed accordingly.

There may be a little time difference between the switching of the part(s) of the heat exchanger which perform the heat exchange operation, and the switching of the motor(s) for driving the fan(s) which send air to the corresponding part(s) of the heat exchanger, as is explained below.

For example, let us assume a configuration in which the heat exchanger has n parts, n motors are provided for the above-mentioned n parts, and depending on the load of the refrigeration cycle equipment, a part or parts, among the n parts, which perform the heat exchange operation are changed, and each of the n motors is driven by the inverter 4 when the corresponding part performs the heat exchange operation.

In such a case, it may be so configured that the driving of each of the n motors by means of the inverter may be started after the part of the heat exchanger corresponding to the particular motor starts the heat exchange operation. With such an arrangement, the driving of the motor is started after the effect of the heat pump operation of the heat pump apparatus appears, so that the power consumption by the motor can be reduced.

Inversely, the driving of each of the n motors by means of the inverter may be started before the part of the heat exchanger corresponding to the particular motor starts the heat exchange operation. With such an arrangement, when the effect of the heat pump operation of the heat pump apparatus appears, the driving of the motor is already started, so that the result of the heat pump operation can be fully utilized.

Also, the driving of each of the n motors by means of the inverter may be stopped after the heat exchange operation of the part of the heat exchanger corresponding to the particular motor is stopped. With such an arrangement, the effect of the heat pump operation can be fully utilized.

Inversely, the driving of each of the n motors by means of the inverter may be stopped before the heat exchange operation of the part of the heat exchanger corresponding to the particular motor is stopped. With such an arrangement, the power consumption by the motor can be reduced.

The configurations described in the embodiments are just but examples of the configurations of the present invention, and can be combined with known technology, or may be partly omitted, or may be changed, without departing from the spirits of the invention.

INDUSTRIAL APPLICABILITY

As has been described, the present invention is suitable for a motor driving apparatus, and refrigeration cycle equipment provided therewith, and can be used in any application in which a plurality of motors are driven at the same rotational speed.

The invention claimed is:

1. A motor driving apparatus comprising:
an inverter which can drive n (n being an integer not smaller than two) motors each having a permanent magnet in its rotor;
a connection switching device to switch a connection state of said n motors; and
a controller to control said inverter and said connection switching device, wherein
when i (i being any of 2 to n) motors among said n motors are concurrently driven by said inverter, output voltages of said inverter are so controlled that phase inductance values of said i motors are identical to each other.

2. The motor driving apparatus as set forth in claim 1, wherein
each of said n motors is an interior magnet synchronous motor.

3. The motor driving apparatus as set forth in claim 1, wherein said connection switching device is formed of wide-bandgap semiconductor.

4. The motor driving apparatus as set forth in claim 1, wherein said connection switching device is formed of electromagnetic switches.

5. The motor driving apparatus as set forth in claim 1, wherein switching elements or freewheel diodes forming said inverter are formed of wide-bandgap semiconductor.

6. Refrigeration cycle equipment comprising the motor driving apparatus as set forth in claim 1.

7. The refrigeration cycle equipment as set forth in claim 6, wherein
a heat exchanger of said refrigeration cycle equipment has n parts,
said n motors are provided corresponding to said n parts,
a part or parts, among said n parts, which perform heat exchange operation are changed according to load of said refrigeration cycle equipment, and
each of said n motors is driven by said inverter when the corresponding part performs the heat exchange operation.

8. The refrigeration cycle equipment as set forth in claim 7, wherein driving of each of said n motors by means of said inverter is started after the part of said heat exchanger corresponding to said each of said motors starts the heat exchange operation.

9. The refrigeration cycle equipment as set forth in claim 7, wherein driving of each of said n motors by means of said inverter is started before the part of said heat exchanger corresponding to said each of said n motors starts the heat exchange operation.

10. The refrigeration cycle equipment as set forth in claim 7, wherein driving of each of said n motors by means of said inverter is stopped after the part of said heat exchanger corresponding to said each of said motors stops the heat exchange operation.

11. The refrigeration cycle equipment as set forth in claim 7, wherein driving of each of said n motors by means of said inverter is stopped before the part of said heat exchanger corresponding to said each of said motors stops the heat exchange operation.

12. A motor driving apparatus comprising:
an inverter which can drive n (n being an integer not smaller than two) motors each having a permanent magnet in its rotor;
a connection switching device to switch a connection state of said n motors; and
a controller to control said inverter and said connection switching device, wherein
when j (j being any of 2 to n) motors among said n motors are concurrently braked by said inverter, switching to braking operation is made after output voltages of said inverter are so controlled that phase inductance values of said j motors become identical to each other.

13. The motor driving apparatus as set forth in claim 12, wherein
each of said n motors is an interior magnet synchronous motor.

14. The motor driving apparatus as set forth in claim 12, wherein said connection switching device is formed of wide-bandgap semiconductor.

15. The motor driving apparatus as set forth in claim 12, wherein said connection switching device is formed of electromagnetic switches.

16. The motor driving apparatus as set forth in claim 12, wherein switching elements or freewheel diodes forming said inverter are formed of wide-bandgap semiconductor.

17. Refrigeration cycle equipment comprising the motor driving apparatus as set forth in claim 12.

18. The refrigeration cycle equipment as set forth in claim 17, wherein
a heat exchanger of said refrigeration cycle equipment has n parts,
said n motors are provided corresponding to said n parts,
a part or parts, among said n parts, which perform heat exchange operation are changed according to load of said refrigeration cycle equipment, and
each of said n motors is driven by said inverter when the corresponding part performs the heat exchange operation.

19. The refrigeration cycle equipment as set forth in claim 18, wherein driving of each of said n motors by means of said inverter is started after the part of said heat exchanger corresponding to said each of said motors starts the heat exchange operation.

20. The refrigeration cycle equipment as set forth in claim 18, wherein driving of each of said n motors by means of said inverter is started before the part of said heat exchanger corresponding to said each of said n motors starts the heat exchange operation.

* * * * *